Oct. 20, 1931.  M. BERGERON  1,828,641
BRAKING APPARATUS FOR AIRCRAFT
Filed Oct. 6, 1930
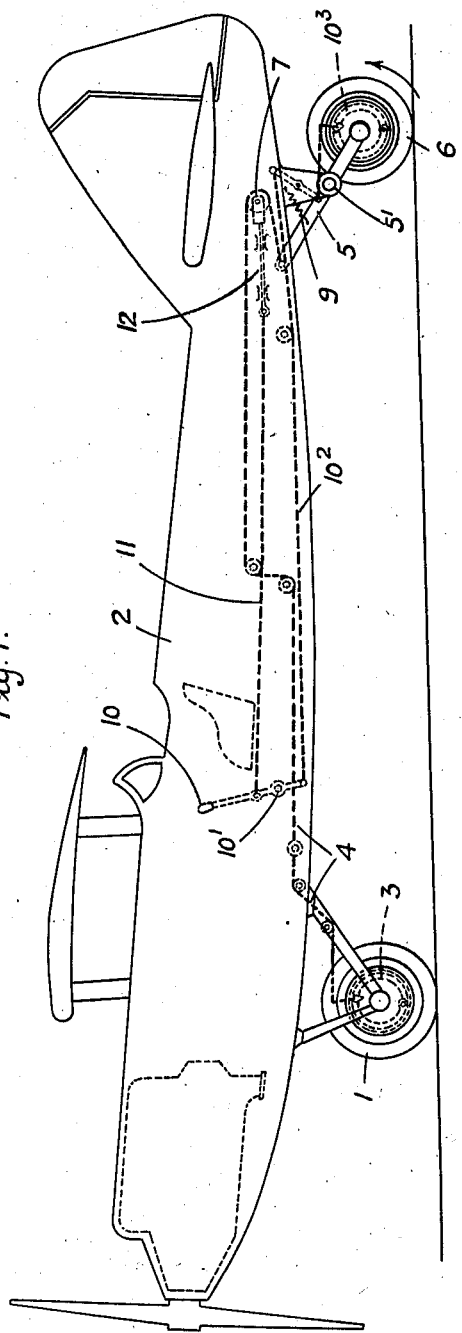
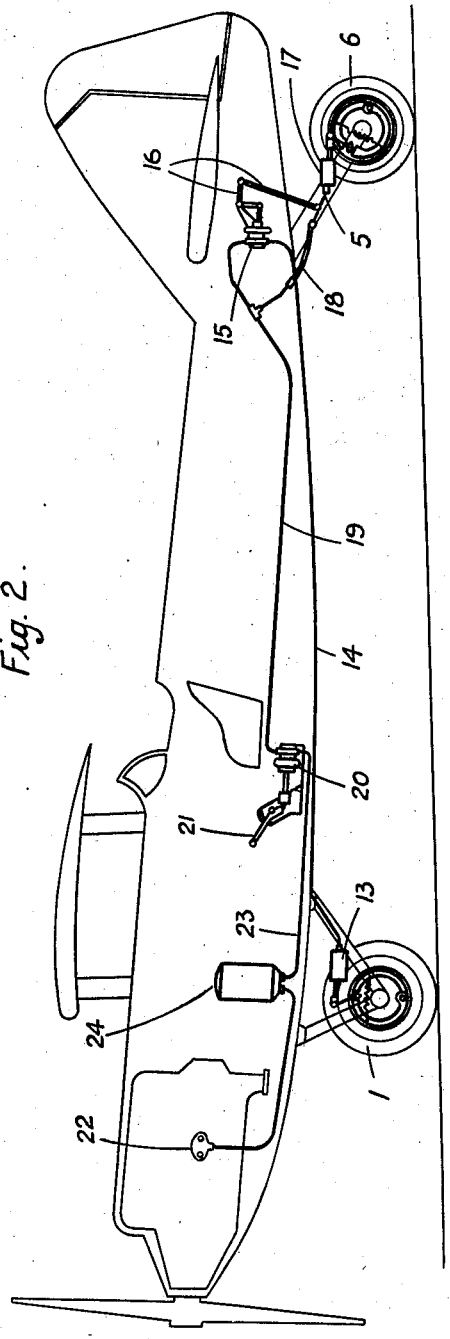
Inventor
Michel Bergeron
by Howard A. Coombs Patented Oct. 20, 1931

1,828,641

UNITED STATES PATENT OFFICE

MICHEL BERGERON, OF PARIS, FRANCE

BRAKING APPARATUS FOR AIRCRAFT

Application filed October 6, 1930, Serial No. 486,794, and in France October 12, 1930.

The invention relates to braking apparatus for aircraft more particularly of the aeroplane type and has for its object to provide improved arrangement of controlling the operation of braking apparatus of this character.

The invention more particularly relates to braking apparatus in which the brakes on the landing wheels of the aircraft are arranged to be automatically controlled in accordance with the pressure exerted by the rear portion of the aircraft upon the ground either through a tail skid or rear landing wheel or wheels, and according to the principal feature of the invention automatic controlling arrangements of this nature are combined with arrangements for enabling the brakes to be also controlled by the pilot, thus enabling him for instance to release the brakes while the machine is travelling along the ground before leaving the latter for flight.

The brakes are preferably but not essentially arranged to be pneumatically applied the suction of the aircraft engine being for instance utilized for this purpose.

In order that the invention may be readily understoood it will now be described by way of example with reference to the accompanying drawings of which:

Figure 1 is a diagrammatic view of an aeroplane provided with braking apparatus and mechanical brake transmission mechanism extending between the supporting member of the rear wheel or tail and the front landing wheels.

Figure 2 is a similar view of an aeroplane provided with pneumatic brake transmission mechanism preferably utilizing the suction in the induction pipe of the aeroplane engine.

Referring now first to Figure 1, it will be seen that the front wheels 1 of the aeroplane 2 comprise segmental brake shoes 3 adapted to be operated by brake transmission 4 connected to the supporting member 5 of the rear wheel 6.

As diagrammatically illustrated the transmission takes the form of a cable 4 passing over a transmission pulley 7 and attached to the free end of the supporting member 5 of the rear wheel 6, this member being shown as pivotally mounted at $5^1$ on the fuselage. A suitably arranged spring 9 tends to rotate the member 5 in a clockwise direction so as to move the wheel 6 away from the fuselage.

It will be clearly evident from Figure 1 that the angular displacement of the supporting member 5 about its pivot $5^1$ in the direction of the arrow which will occur when the rear wheel rests on the ground will exert a pull on the cable 4 and apply the front wheel brakes, the reverse movement of the supporting member 5 effecting the release of these brakes. Independent control of the brakes by the pilot, is also provided permitting, on the one hand, the release of the brakes on the front wheels, when it is desired to taxi along the ground, and on the other hand, the application of the rear wheel brake. For this purpose a control lever 10 pivotally mounted at $10^1$ is arranged within convenient reach of the pilot, this lever being adapted when rotated in an anticlockwise direction about its pivot $10^1$ to displace the transmission pulley 7 towards the left by means of a cable 11 and rod 12 on which the pulley 7 is mounted. The movement of the pulley 7 towards the left will evidently slacken the cable 4 and thus release the front brakes. The control lever 10 also serves for effecting the application of the brake on the rear wheel only, the brakes on the front wheels being operated solely by the displacement of the rear wheel. For this purpose a suitable point in the lever 10 is operatively connected by means of a cable $10^2$ passing over suitable pulleys to the operating member of the brake $10^3$ on the rear wheel 6. It will be evident that by rocking the lever 10 forward on its pivot $10^1$ the brakes on the front wheels are released, while by rocking the lever 10 backwards the rear wheel brake is applied.

Referring now to the construction shown in Figure 2 in which the brakes are arranged to be operated by the suction of the engine the wheels of the front loading carriage are provided with brake drums the brake shoes of which are arranged to be operated by a brake cylinder 13 which communicates through a pipe 14 with a controlling or distributing valve device 15, of known type.

The controlling valve device 15 is arranged to be actuated by lever and rod mechanism 16 connected to the pivoted supporting member 5 of the rear wheel 6, comprising a brake drum having brake shoes operated by the brake cylinder 17 which communicates through a flexible pipe 18 with a pipe 19 establishing communication between the controlling valve device 15 and another controlling valve device 20 adapted to be actuated by a lever 21 within easy reach of the pilot. The controlling valve device 20 is arranged to communicate as indicated at 22 with the induction pipe of the engine through a pipe 23 in which a vacuum reservoir 24 is interposed.

With the lever 21 in its release position as shown in Figure 2 the controlling valve device establishes communication between the pipe 19 and the atmosphere, and the rear wheel being on the ground, the controlling valve device 15 is actuated by the supporting member 5 of the rear wheel so as to establish communication between the pipes 14 and 19. The brake cylinders 13 and 17 are thus in open communication with the atmosphere so that the brakes on the front and rear wheels are released.

Before commencing a flight, the pilot adjusts the lever 21 in one of the braking notches of the notched segment associated with the valve device 20 and starts the engine. The vacuum produced in the pipe 23 is transmitted through the controlling valve device 20 and the pipes 19 and 18 to the brake cylinder 17, the piston of which is consequently displaced towards the left so as to apply the rear wheel brake. It is evident that this will only be effected if the engine is actually running and in order to provide for braking while the engine is being started or tested it is of advantage to provide an auxiliary vacuum reservoir as indicated at 24.

The rear wheel is maintained as usual on the ground, by the pilot correspondingly operating the elevator control, so that the control valve device 15 is maintained by the supporting member 5 of the rear wheel 6 in its open position in which communication is established between the pipes 14, 19. The suction transmitted through the pipe 14 is thus exerted in the brake cylinder 13 so as to cause the front wheel brakes to be applied. Upon actually leaving the ground the pilot will adjust the lever 21 to its release position.

From the above description it will be evident that the pilot has full command of the brakes while the aeroplane is in contact with the ground at the beginning of a flight so that the usual wedges or wheel chocs are unnecessary.

Before landing the pilot will adjust the lever 21 in one or other of the braking notches of the notched segment associated with the valve device 20 so that the brakes on the rear wheels are applied. So long however as the rear wheel is out of contact with the ground the front wheel brakes are not applied since under these conditions the supporting member 5 is in such a position that the controlling valve device 15 cuts off communication between the pipes 14 and 19. When however the rear wheel engages with the ground the valve device 15 is actuated so as to open communication between the pipes 14 and 19 and the brakes are applied on the front wheels with a force proportional to the weight on the rear or tail wheel 6. If the braking of the front wheels is too great, the nose of the aeroplane tends to dip, and the tail rises so that the control valve device 15 is closed and the front brake cylinder 13 is vented to the atmosphere thereby releasing the front wheel brakes, and avoiding capsizing the aeroplane. The brake on the rear wheel remains applied however and when this wheel again comes into contact with the ground the front wheel brakes are again applied.

The controlling valve device 15 may be arranged to be actuated either directly by means of lever and rod mechanism 16 as shown or by a cable passing over suitable pulleys so as to permit the valve device to be located towards the front of the aeroplane. Instead of utilizing the suction obtaining in the induction pipe for operating the brakes compressed air or other fluid or liquid under pressure may evidently be utilized.

It will be evident that the invention is not limited to the particular construction and arrangement of parts hereinbefore described which may be varied as desired to suit particular requirements without exceeding the scope of the invention.

Having now described my invention, what I claim as new and desire to secure by Letters Patent is:—

1. In braking apparatus for aircraft the combination of a member for supporting the rear portion of the aircraft, front and rear brakes for controlling the movement of the aircraft along the ground, means actuated by fluid under pressure for operating said brakes, a valve device for controlling the supply of fluid under pressure to said front brakes, means for operating said valve device in accordance with the pressure exerted upon said member by said rear portion, and a second valve device under the control of the pilot for controlling the supply of fluid under pressure to said first valve device and to said rear brakes.

2. In braking apparatus for aircraft, the combination of a member for supporting the rear portion of the aircraft, front and rear brakes, for controlling the movement of the aircraft along the ground, means actuated by the suction of the aircraft engine for operating said brakes, a valve device under the control of the pilot for controlling communication between the induction pipe of the engine and the rear brakes and a second valve device operated by said supporting member for controlling communication between the first valve device and said front brakes.

3. In braking apparatus for aircraft, the combination of a member for supporting the rear portion of the aircraft, front and rear brakes for controlling the movement of the aircraft along the ground, means for effecting the transmission of a braking effort to the front brakes, means for varying said braking effort automatically in accordance with the pressure exerted upon the said member by said rear portion, and a single pilot's control device for effecting, on the one hand, the application and release of the rear brakes and, on the other hand, the release of the front brakes independently of one another and of the member supporting said rear portion.

In witness whereof I have hereunto set my hand.

MICHEL BERGERON.